(12) United States Patent
Lai et al.

(10) Patent No.: US 12,400,449 B2
(45) Date of Patent: Aug. 26, 2025

(54) SELF-SUPERVISED MULTIMODAL REPRESENTATION LEARNING WITH CASCADE POSITIVE EXAMPLE MINING

(71) Applicant: NEC Laboratories America, Inc., Princeton, NJ (US)

(72) Inventors: Farley Lai, Santa Clara, CA (US); Asim Kadav, Mountain View, CA (US); Cheng-En Wu, Madison, WI (US)

(73) Assignee: NEC Corporation, Tokyo (JP)

( * ) Notice: Subject to any disclaimer, the term of this patent is extended or adjusted under 35 U.S.C. 154(b) by 548 days.

(21) Appl. No.: 17/940,599

(22) Filed: Sep. 8, 2022

(65) Prior Publication Data

US 2023/0086023 A1 Mar. 23, 2023

Related U.S. Application Data

(60) Provisional application No. 63/279,198, filed on Nov. 15, 2021, provisional application No. 63/243,816, filed on Sep. 14, 2021.

(51) Int. Cl.
*G06V 20/40* (2022.01)
*G06V 10/771* (2022.01)

(52) U.S. Cl.
CPC ............ *G06V 20/46* (2022.01); *G06V 10/771* (2022.01)

(58) Field of Classification Search
None
See application file for complete search history.

(56) References Cited

U.S. PATENT DOCUMENTS

2024/0331389 A1* 10/2024 Dave ..................... G06V 20/44
2024/0404283 A1* 12/2024 Wang .................. G06V 10/776

OTHER PUBLICATIONS

Tengda Han, Weidi Xie, Andrew Zisserman. Self-supervised Co-Training for Video Representation Learning. In Hugo Larochelle, Marc'Aurelio Ranzato, Raia Hadsell, Maria-Florina Balcan, Hsuan-Tien Lin, editors, Advances in Neural Information Processing Systems 33: Annual Conference on Neural Information Processing Systems 2020, NeurIPS 2020, Dec. 6-12, 2020, virtual. 2020. [doi].

* cited by examiner

*Primary Examiner* — Dov Popovici
(74) *Attorney, Agent, or Firm* — Joseph Kolodka

(57) ABSTRACT

A method for model training and deployment includes training, by a processor, a model to learn video representations with a self-supervised contrastive loss by performing progressive training in phases with an incremental number of positive instances from one or more video sequences, resetting the learning rate schedule in each of the phases, and inheriting model weights from a checkpoint from a previous training phase. The method further includes updating the trained model with the self-supervised contrastive loss given multiple positive instances obtained from Cascade K-Nearest Neighbor mining of the one or more video sequences by extracting features in different modalities to compute similarities between the one or more video sequences and selecting a top-k similar instances with features in different modalities. The method also includes fine-tuning the trained model for a downstream task. The method additionally includes deploying the trained model for a target application inference for the downstream task.

20 Claims, 10 Drawing Sheets

SELF-SUPERVISED MULTIMODAL REPRESENTATION LEARNING WITH CASCADE POSITIVE EXAMPLE MINING

RELATED APPLICATION INFORMATION

This application claims priority to U.S. Provisional Patent Application Ser. No. 63/243,816, filed on Sep. 14, 2021, U.S. Provisional Patent Application Serial No. and 63/279,198, filed on Nov. 15, 2021, incorporated herein by reference in its entirety.

BACKGROUND

Technical Field

The present invention relates to artificial intelligence and more particularly to self-supervised multimodal representation learning with cascade positive example mining.

Description of the Related Art

Self-supervised representation learning has become more and more popular in recent years. Numerous contrastive loss based tasks are proposed to learn the representation spatiotemporally without class labels. The basic idea is to generate positive instances from a given anchor example as its own class. Common methods include data augmentation and feature extraction from multiple views in different modalities given the same input example. In the case of video, the typical practice is to subsample frames into a clip and train the model to produce features highly similar to another clip from the same video at a different temporal location and/or with data augmented frames. Hence, clips from the same video are viewed as positive instances or negative ones otherwise for self-supervised learning without labels. However, positive instances would be limited to augmentation or subsampling from the same anchor video, constraining downstream task performance for the lack of opportunities to learn but repel positive instances from different examples in the same class.

SUMMARY

According to aspects of the present invention, a computer-implemented method for model training and deployment is provided. The method includes training, by a hardware processor, a model to learn video representations with a self-supervised contrastive loss by performing progressive training in phases with an incremental number of positive instances from one or more video sequences, resetting the learning rate schedule in each of the phases, and inheriting model weights from a checkpoint from a previous training phase. The method further includes updating the trained model with the self-supervised contrastive loss given multiple positive instances obtained from Cascade K-Nearest Neighbor mining of the one or more video sequences by extracting features in different modalities to compute similarities between the one or more video sequences and selecting a top-k similar instances with features in different modalities. The method also includes fine-tuning the trained model for a downstream task. The method additionally includes deploying the trained model for a target application inference for the downstream task.

According to other aspects of the present invention, a computer program product for model training and deployment is provided. The computer program product includes a non-transitory computer readable storage medium having program instructions embodied therewith. The program instructions are executable by a computer to cause the computer to perform a method. The method includes training, by a hardware processor of the computer, a model to learn video representations with a self-supervised contrastive loss by performing progressive training in phases with an incremental number of positive instances from one or more video sequences, resetting the learning rate schedule in each of the phases, and inheriting model weights from a checkpoint from a previous training phase. The method further includes updating, by the hardware processor, the trained model with the self-supervised contrastive loss given multiple positive instances obtained from Cascade K-Nearest Neighbor mining of the one or more video sequences by extracting features in different modalities to compute similarities between the one or more video sequences and selecting a top-k similar instances with features in different modalities. The method also includes fine-tuning, by the hardware processor, the trained model for a downstream task. The method additionally includes deploying, by the hardware processor, the trained model for a target application inference for the downstream task.

According to still other aspects of the present invention, a computer processing system for model training and deployment is provided. The computer processing system includes a memory device for storing program code. The computer processing system further includes a hardware processor operatively coupled to the memory device for running the program code to train a model to learn video representations with a self-supervised contrastive loss by performing progressive training in phases with an incremental number of positive instances from one or more video sequences, resetting the learning rate schedule in each of the phases, and inheriting model weights from a checkpoint from a previous training phase. The hardware processor further runs the program code to update the trained model with the self-supervised contrastive loss given multiple positive instances obtained from Cascade K-Nearest Neighbor mining of the one or more video sequences by extracting features in different modalities to compute similarities between the one or more video sequences and selecting a top-k similar instances with features in different modalities. The hardware processor also runs the program code to fine-tune the trained model for a downstream task. The hardware processor additionally runs the program code to deploy the trained model for a target application inference for the downstream task.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to self-supervised multimodal representation learning with cascade positive example mining.

Embodiments of the present invention aim to improve self-supervised representation learning while complementing existing pretext tasks based on contrastive losses. Several downstream applications such as video retrieval and action recognition can benefit from embodiments of the present invention due to better learned representations.

Previous works tend to limit the positive instances to augmented versions or different views of an input anchor example. Embodiments of the present invention address the constraint by mining positive instances from other examples likely in the same class of the input anchor during the model training process. This results in improved downstream task performance that expect similar representations of examples in the same class.

Specifically, embodiments of the present invention feature Cascade K-Nearest Neighbor Mining and Progressive Training. The former, namely Cascade K-Nearest Neighbor Mining, exploits multiple views of an anchor example in different modalities, where one particular view could help find another example similar in the same view. In the case of video, two golf recordings may look dissimilar due to different backgrounds but their motion views are likely very similar. On the other hand, the latter, namely Progressive Training, trains the model to learn the representation with an incremental number of positive instances from different examples in successive phases. This facilitates mining positive instances with high confidence and learning stable features. In summary, combining both the above inventive features, the proposed self-supervised representation learning technique allows for effectively learning discriminative representations beyond positive instances simply from augmentation or alternative views of the current input anchor example for downstream tasks.

Figure 1:
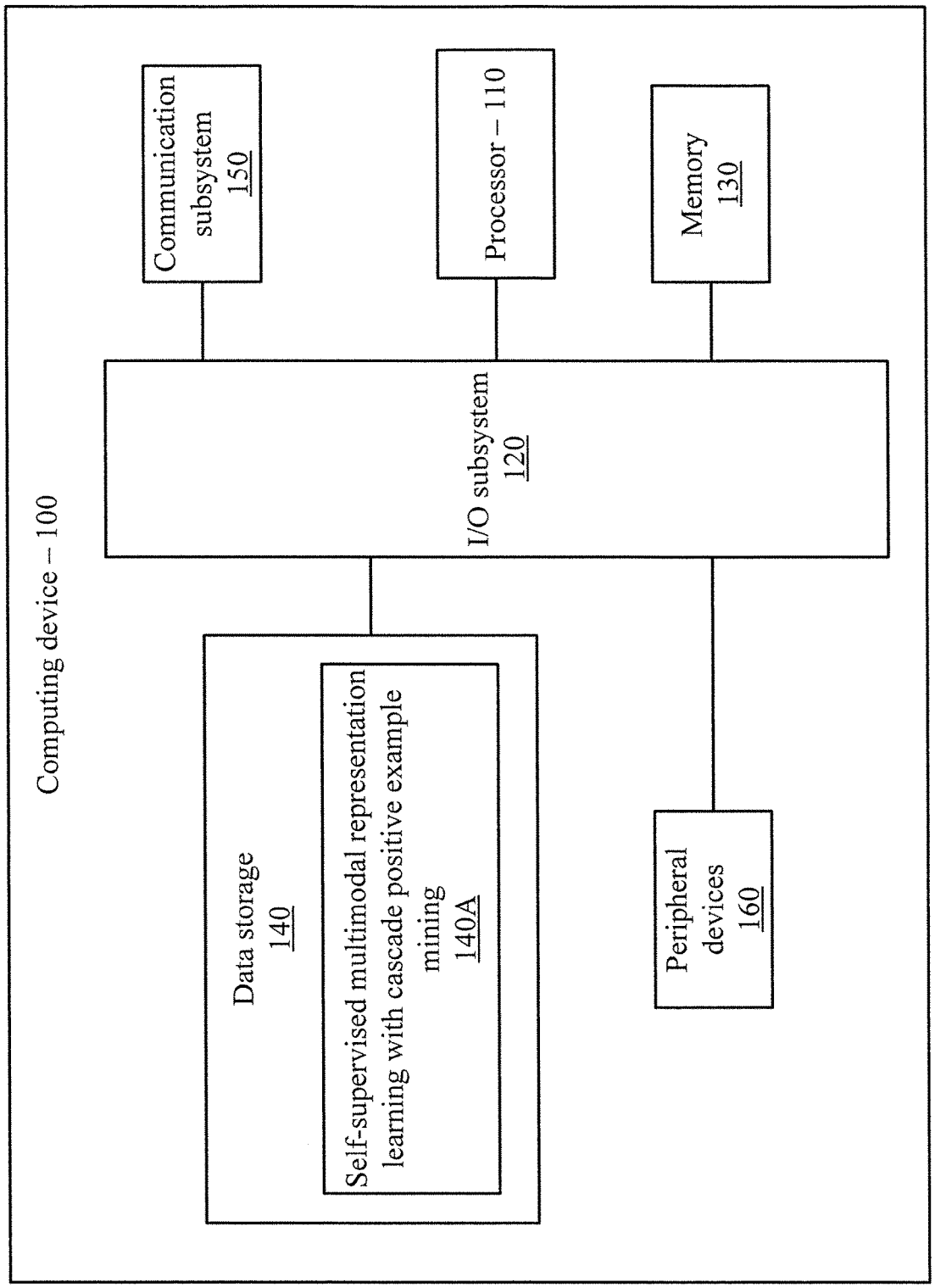
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform self-supervised multimodal representation learning with cascade positive example mining.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for self-supervised multimodal representation learning with cascade positive example mining. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
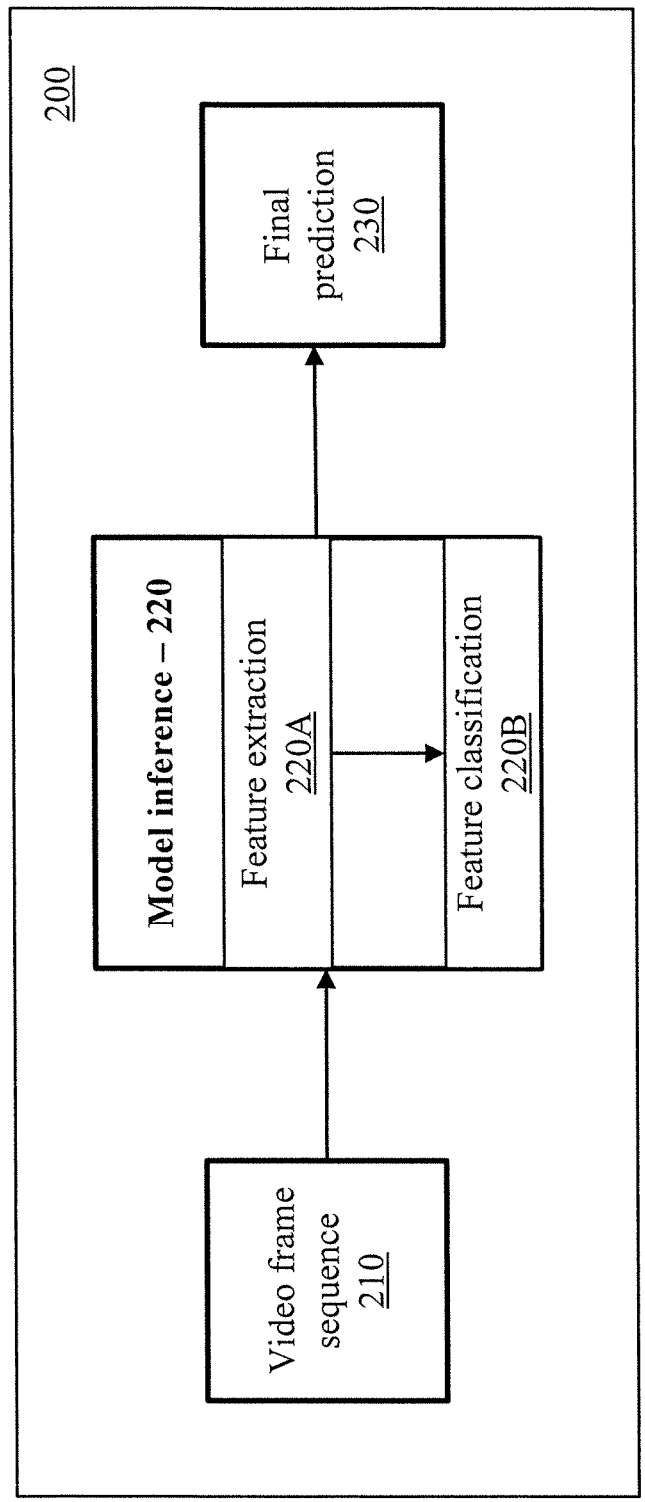
FIG. 2 is a block diagram showing an exemplary video classification system, in accordance with an embodiment of the present invention.

These and other variations of a hardware processor subsystem are also contemplated in accordance with embodiments of the present invention It is to be appreciated that a typical video classification application can benefit from embodiments of the present invention for improved video representations. Assuming a video classification task such as action recognition, an embodiment of the present invention accepts a potentially subsampled sequence of video frames 210 at runtime and makes a prediction 230 in the inference mode 220 of a trained computer vision (CV) model as shown in FIG. 2. FIG. 2 is a block diagram showing an exemplary video classification system 200, in accordance with an embodiment of the present invention. The CV model design is usually based on a deep neural network to generate the video representation from a video clip for linear classification. The model inference 220 involves feature extraction 220A and feature classification 220B.

Figure 3:
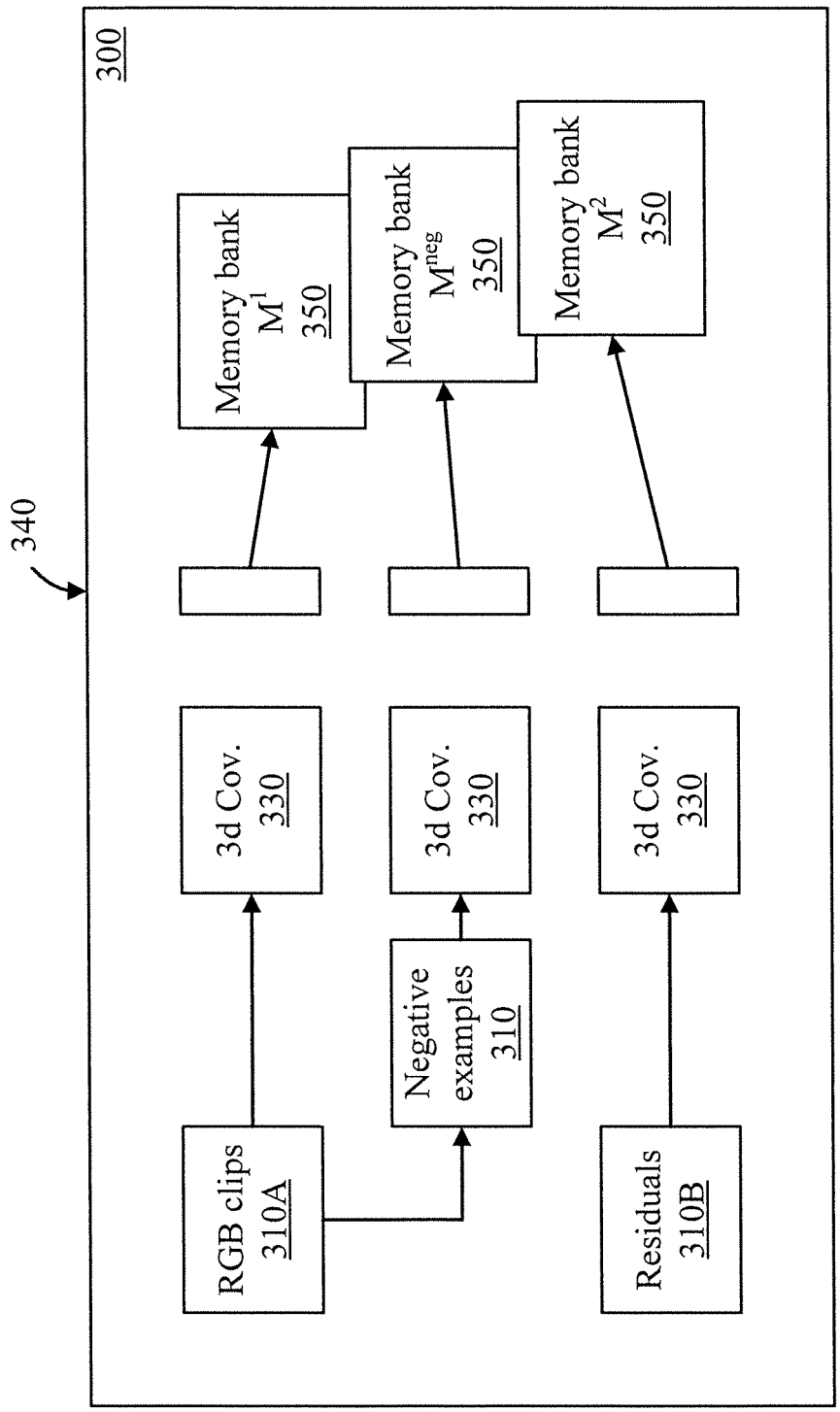
FIG. 3 is a block diagram showing exemplary self-supervised contrastive learning using different video modalities during model training, in accordance with an embodiment of the present invention.

FIG. 3 is a block diagram showing exemplary self-supervised contrastive learning 300 using different video modalities during model training, in accordance with an embodiment of the present invention. 3D Cov 330 represents typical 3D convolutional layers for video representation learning. Memory banks 350 are used to cache extracted features in different modalities to speed up self-supervised training. During training, the CV model learns the video representation through self-supervision from mined positive examples from different videos suggested by the present invention. Specifically, the model extracts video features 340 from a sequence of frames as a clip in different modalities including but not limited to the decompressed RGB pixels 310A and motion residuals 310B from frame differences. Then, similarity scores in one modality between the videos can be computed based on the extracted feature vectors 340. Following the contrastive learning technique, the model is trained to generate similar clip feature representations given positive feature pairs either in the same or different modalities from the same video. Negative examples (feature pairs) 310 can be formulated from a spatiotemporally manipulated frame sequence or simply from other videos, forcing the model to generate dissimilar clip feature representations.

Figure 4:
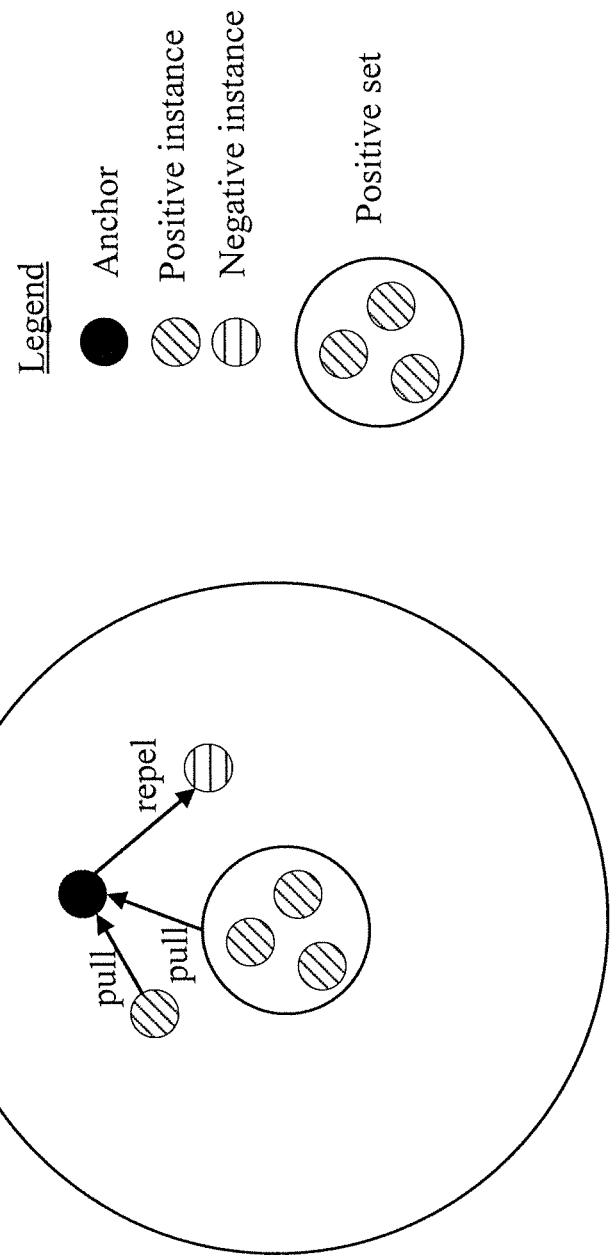
FIG. 4 is a block diagram showing a feature of the self-supervised contrastive learning of FIG. 3, in accordance with an embodiment of the present invention.

FIG. 4 is a block diagram showing a feature of the self-supervised contrastive learning 300 of FIG. 3, in accordance with an embodiment of the present invention.

The contrastive learning involves pulling positive feature pairs (Cat-Cat) in the same or different modalities and repelling negative pairs (Cat-Dog) from spatiotemporally manipulated frames or other videos. Thus, it is proposed to find positives from other videos with cascade KNN mining, and then to perform contrastive learning with progressive training.

Figure 5:
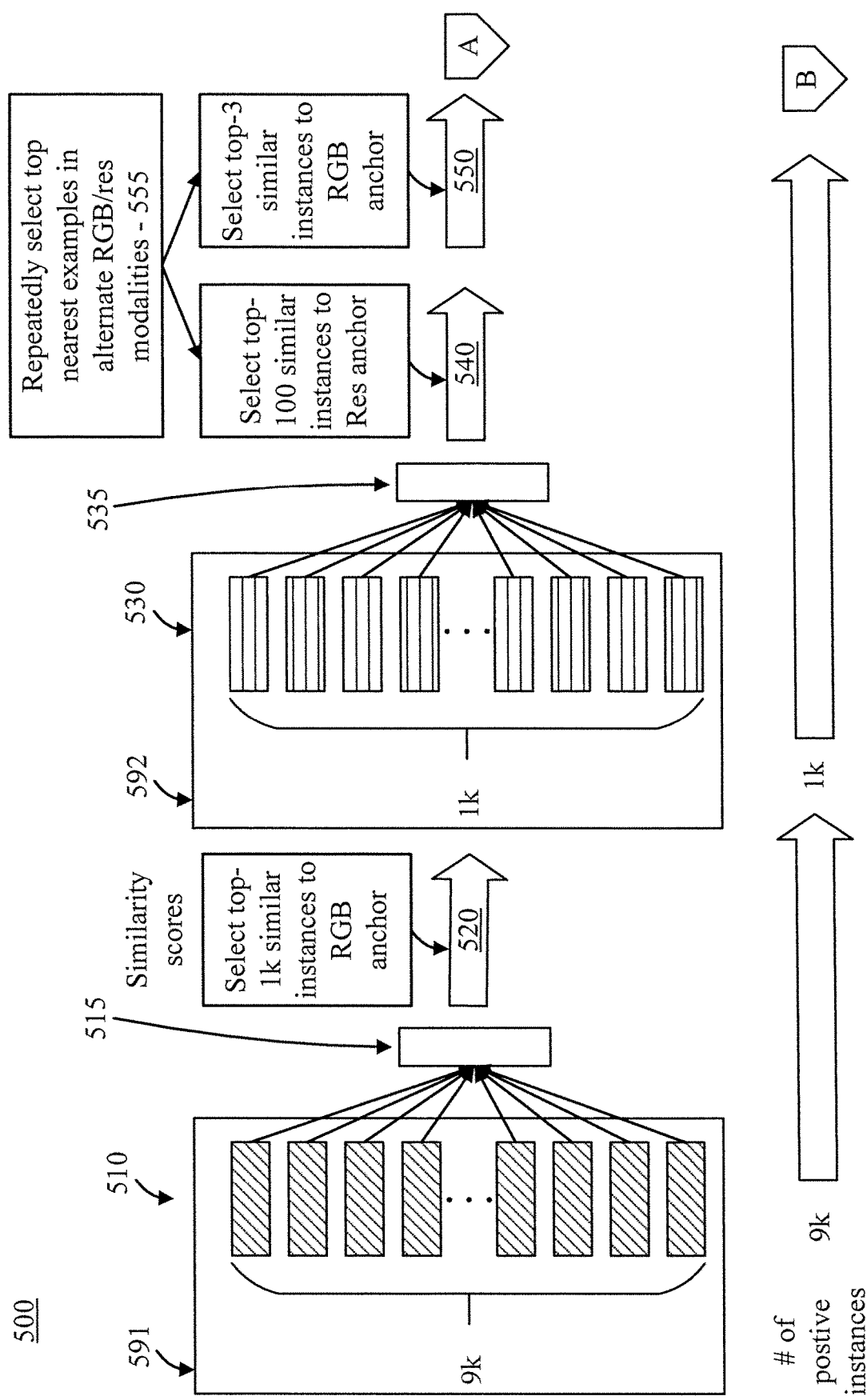
FIGS. 5-6 are block diagrams showing exemplary cascade k-nearest neighbor mining for positive examples, in accordance with an embodiment of the present invention.
Figure 6:
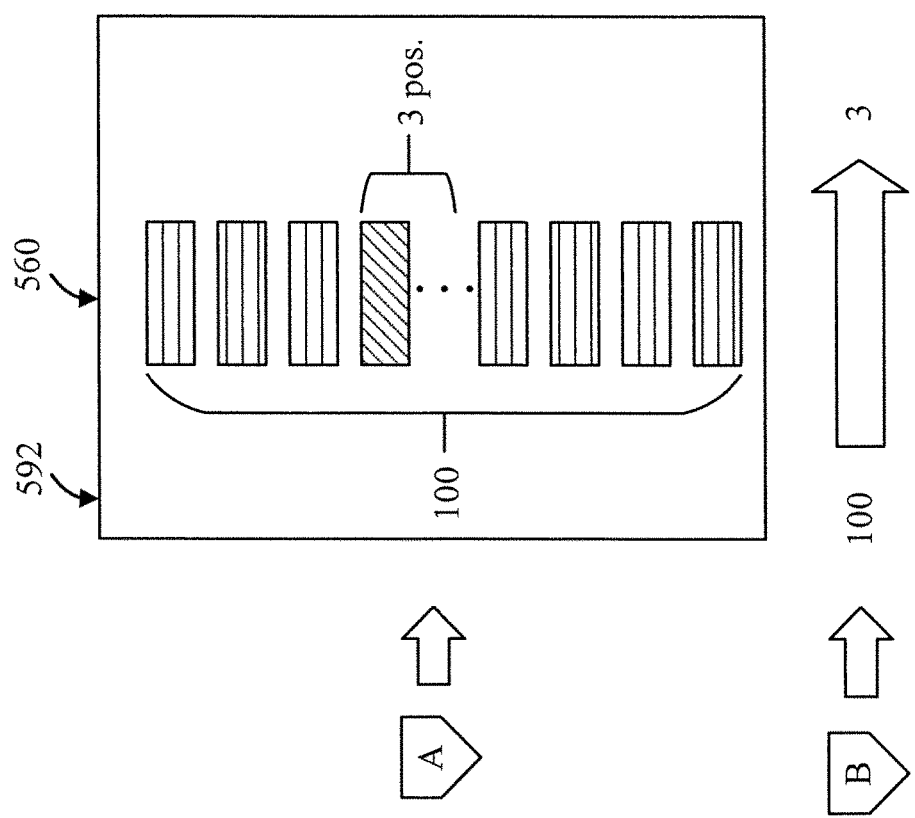
Figure 7:
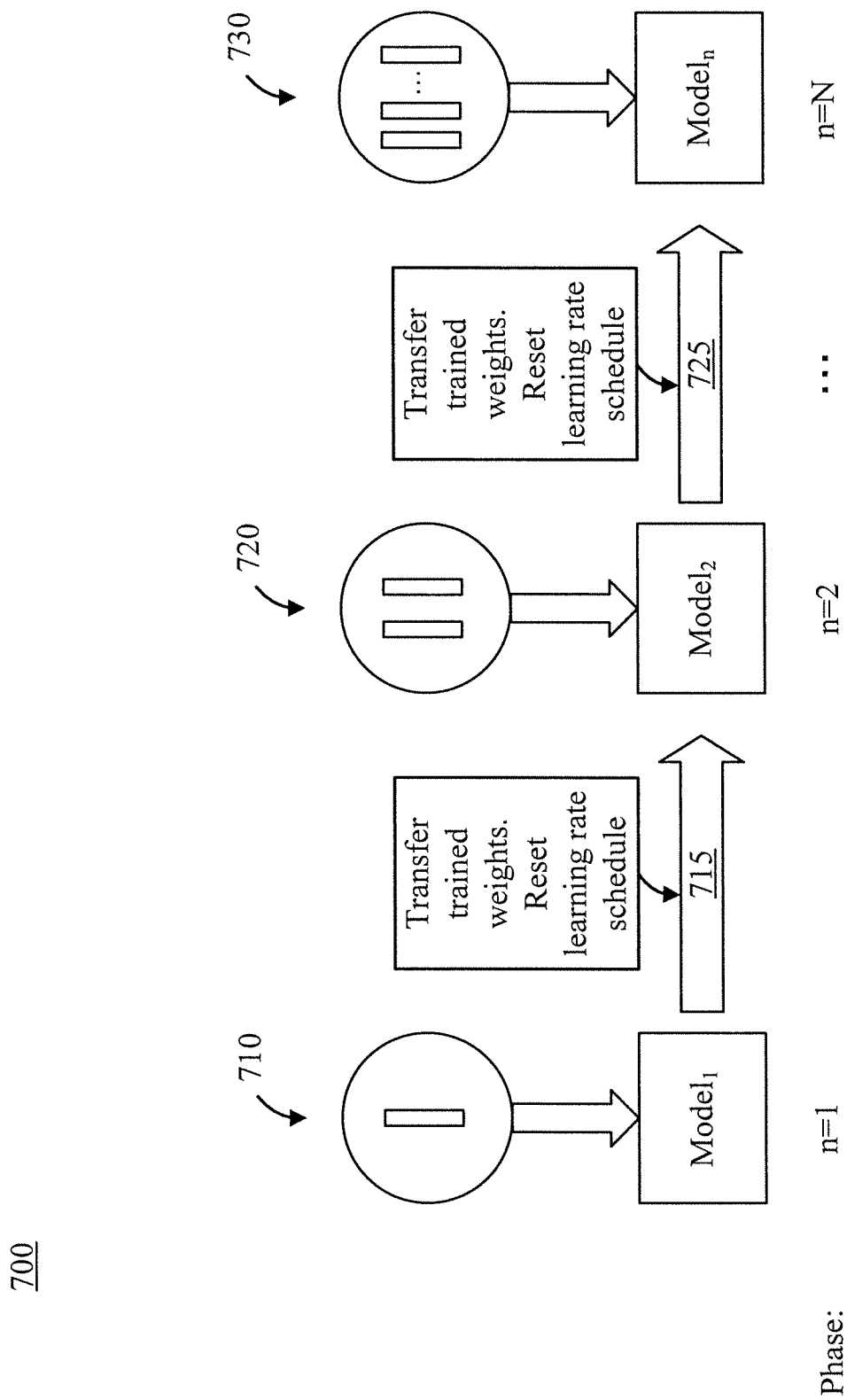
FIG. 7 is a diagram showing a progressive training regime, in accordance with an embodiment of the present invention.

FIGS. 5-6 are block diagrams showing exemplary cascade k-nearest neighbor mining 500 for positive examples, in accordance with an embodiment of the present invention. Embodiments of the present invention further propose to find highly similar but different video clips as positive examples to learn the representations with the cascade K-Nearest Neighbor mining as demonstrated in FIGS. 5-6 where eventually k=3 clip features from different videos are mined as positives while the others are viewed as negatives. Next, to effectively learn stable representations from more positive examples, the progressive training regime is applied as shown in FIG. 7 where the model is trained in phases with different k positive examples to mine. Finally, the trained model can be fine-tuned for the downstream task for even better results.

Starting from the beginning in FIGS. 5-6, compute the similarity scores for each feature vector in the RGB memory bank 510 based on the RGB anchor and select the top-1000 instances 520. In the next stage, compute the similarity scores for each feature vector in the alternative modality Res memory bank 530 based on the Res anchor and select the top-100 instances 540. Repeat alternately between modalities 555 and select the top-k instances 550 in the final stage 560.

FIG. 7 is a diagram showing a progressive training regime 700, in accordance with an embodiment of the present invention.

In the first phase, corresponding to n=1 and model$_1$, the model model$_1$ is trained with a positive set 710 containing 1 positive. In the second phase, corresponding to n=2 and model$_2$, the model model$_2$ is trained with a larger positive set 720 containing 2 or more positives. This continues up to an Nth phase, corresponding to n=N and model$_n$, where the model model$_n$ is trained with a positive set 730 containing k positives. The total number of phases is a hyperparameter and should be determined empirically.

In each of the phases, it is possible to reset and use different learning rate schedules while inheriting model weights from a checkpoint from a previous training phase 715, 725.

A further description will now be given regarding contrastive learning for video representation, in accordance with an embodiment of the present invention.

Treat each clip as an instance. Two clips from the same video are positive pairs while two clips from different videos are negative pairs. Pull positive pairs closer while repelling negative pairs farther.

Figure 8:
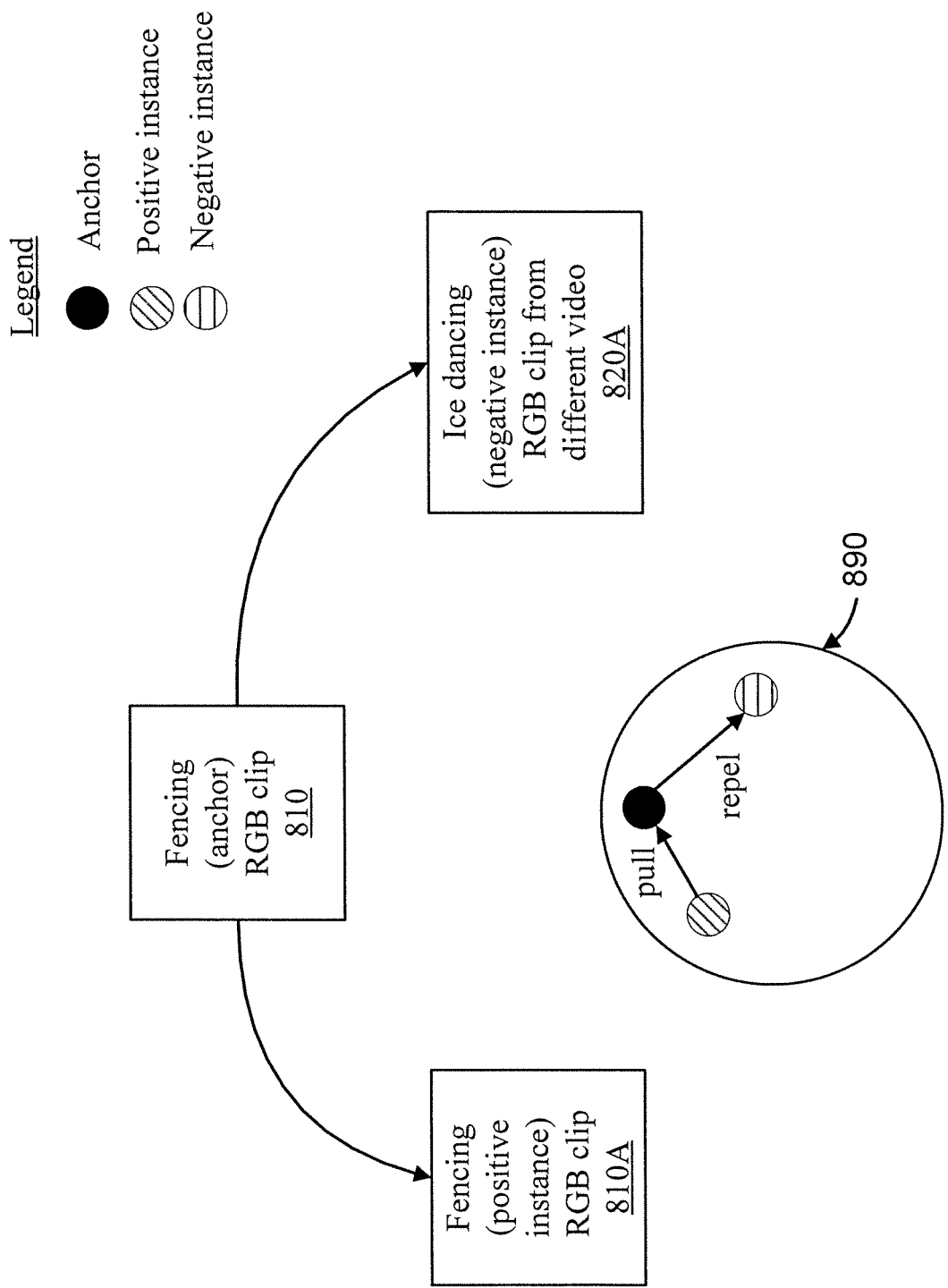
FIG. 8 is a diagram showing contrastive learning for video representation, in accordance with an embodiment of the present invention.

FIG. 8 is a diagram showing contrastive learning 800 for video representation, in accordance with an embodiment of the present invention.

An anchor video sequence 810 pertaining to fencing is provided. Two clips 810A are taken from the anchor video sequence 810 and two clips 820A are taken from a different video pertaining to ice dancing.

The clips 810A pertaining to fencing are pulled to the anchor 891 in feature space 890, while the clips 820A pertaining to ice dancing are repelled from the anchor 891 in the feature space 890

Weaknesses of instance-level discrimination: always repel different instances even from the same action (class). Therefore, learning representations with action-level discrimination can give some downstream tasks (e.g., action recognition) better performance.

It is to be appreciated that the present invention can learn from multiple modalities.

Optical flow is useful for motion capture but is computationally expensive. RGB frames, motion vectors and residuals are available from compressed videos for free. Learning from these low-cost modalities is beneficial for video understanding tasks in resource constrained systems.

Figure 9:
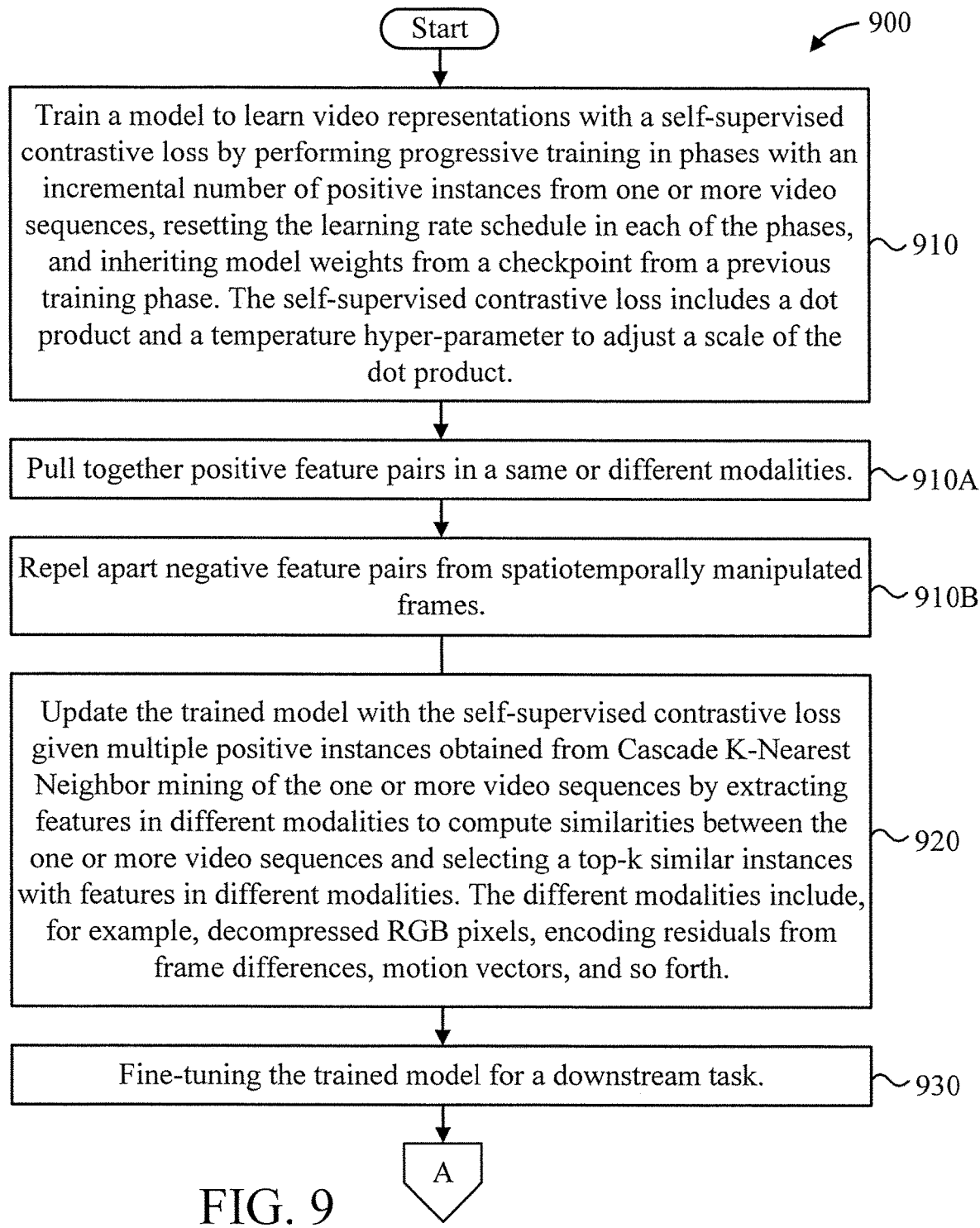
FIG. 9-10 are flow diagrams showing an exemplary method for self-supervised multimodal representation learning with cascade positive example mining, in accordance with an embodiment of the present invention.
Figure 10:
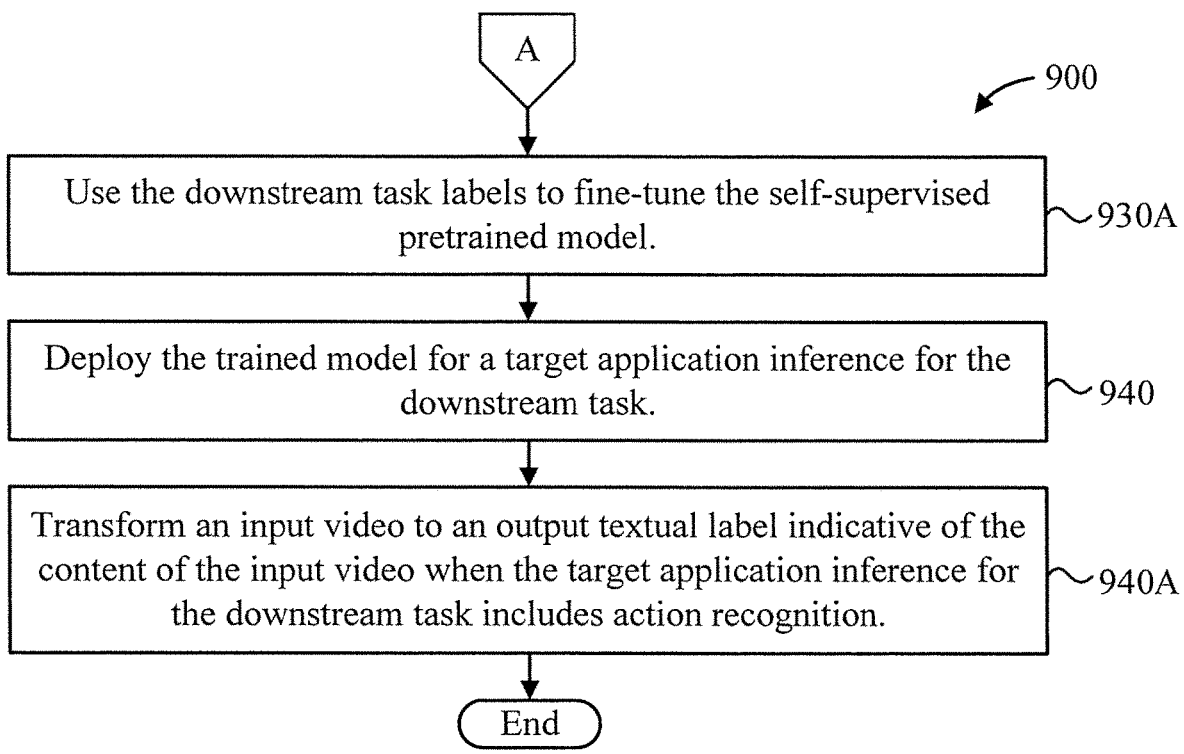

FIGS. 9-10 are flow diagrams showing an exemplary method 900 for self-supervised multimodal representation learning with cascade positive example mining, in accordance with an embodiment of the present invention.

At block 910, train a model to learn video representations with a self-supervised contrastive loss by performing progressive training in phases with an incremental number of positive instances from one or more video sequences, resetting the learning rate schedule in each of the phases, and inheriting model weights from a checkpoint from a previous training phase. The self-supervised contrastive loss includes a dot product and a temperature hyper-parameter to adjust a scale of the dot product.

In an embodiment, block 910 can include one or more of blocks 910A through 910C.

At block 910A, pull together positive feature pairs in a same or different modalities.

At block 910B, repel apart negative feature pairs from spatiotemporally manipulated frames.

At block 920, update the trained model with the self-supervised contrastive loss given multiple positive instances obtained from Cascade K-Nearest Neighbor mining of the one or more video sequences by extracting features in different modalities to compute similarities between the one or more video sequences and selecting a top-k similar instances with features in different modalities. The different modalities include, for example, decompressed RGB pixels, encoding residuals from frame differences, motion vectors, and so forth.

At block 930, fine-tuning the trained model for a downstream task.

In an embodiment, block 930 can include block 930A.

At block 930A, use the downstream task labels to fine-tune the self-supervised pretrained model.

At block 940, deploy the trained model for a target application inference for the downstream task.

In an embodiment, block 940 can include one or more of blocks 940A.

At block 940A, transform an input video to an output textual label indicative of the content of the input video when the target application inference for the downstream task includes action recognition.

A further description will now be given regarding various aspects of the present invention.

First, the concept of contrastive learning with different forms of the discrimination learning objective is discussed. Next, the proposed cascade mining approach as shown in FIGS. 5-6 is discussed. This approach is the extension of the existing contrastive learning-based methods to strengthen their ability to discover more selective and diverse positive examples against false positive examples.

Instance Discrimination

Recently, contrastive learning has been introduced to perform self-supervised video representation learning by discriminating instances (videos). Specifically, given a set of videos V, a video $v_i$ is randomly sampled from V and then is augmented its corresponding video $v_i^+$. Both videos become a positive pair $v_i$ and $v_i^+$. On the other hand, a set of negative examples $N^-$ consists of those examples $v_j^-$, $j \neq i$. These examples are fed into a query encoder and a key encoder to obtain the visual representations. The output feature of the query denotes q, its augmentation denotes $q_i^+$, and negative key denotes $k_j^-$. Then, InfoNCE loss is applied as:

$$\mathcal{L}_N = -\log \frac{\exp\left(q_i \cdot \frac{q_i^+}{\tau}\right)}{\exp\left(q_i \cdot \frac{q_i^+}{\tau}\right) + \sum_{j=1}^{N} \exp\left(q \cdot \frac{k_j^-}{\tau}\right)} \quad (1)$$

where dot product is a similarity with a temperature hyper-parameter τ to adjust its scale. InfoNCE loss aims to pull the positive pair closer while pushing the negative pair far apart. However, this loss only considers the augmentation of the query as a positive key and regards all other examples as the negative keys. This problem causes the model training with InfoNCE loss ignore the relationship across different videos with the same label.

Multi-Instance Discrimination

To solve this problem mentioned above, the model is optimized with Multi-Instance InfoNCE loss as follows:

$$\mathcal{L}_M = -\log \frac{\sum_{p \in P} \exp\left(q_i \cdot \frac{q_p^+}{\tau}\right)}{\sum_{p \in P} \exp\left(q_i \cdot \frac{q_p^+}{\tau}\right) + \sum_{j=1}^{N} \exp\left(q_i \cdot k_j^- / \tau\right)} \quad (2)$$

where P is a positive set including the augmentation of the query and other keys with the same label as the query. For example, on an action video dataset, a "fencing" positive set includes the query video's augmentation and other videos with the "fencing" label. However, annotations are not available under the scope of self-supervised learning. To achieve this objective in unsupervised learning, a self-supervised approach CoCLR has been proposed that exploits optical flow to discover positive inter-examples forming a positive set. The main idea is that some particular actions with a fixed motion pattern such as running and jumping are easy to discover their inter-videos from the Flow view. In this way, CoCLR generates pseudo-labels for selected positive examples from the Flow view to help the model training with the positive set consisting of RGB examples. Specifically, given a query video including both RGB and Flow view, we first use the query video from Flow view to perform K nearest neighbors selecting top K most similar videos. Then, these top K videos return their corresponding index from RGB view to construct the positive set for training the RGB model. When the positive set is available, the model is able to be applied Multi-Instance InfoNCE loss (as Eq. 2) to learn representations beyond instance-level discrimination. However, there is an issue for CoCLR suffering from false positive examples with similar motion patterns from Flow view but from different classes. This is because CoCLR only focuses on a single view to mine positive examples, which means some actions with very close motion patterns such as "Shotput" and "ThrowDiscus" can confuse the model to classify.

Cascade Mining

Unlike the approach that heavily relies on a single view, our proposed method fully exploits the advantage of Multiview to improve the capability of mining positive examples. As shown in FIGS. 5-6, the overview of cascade mining is a procedure to alternate from RGB and Flow view to mining positive examples with the top K most similar appearance and motion as the query video. At first, CoCLR is followed to train both RGB and Flow models with InfoNCE loss at the initialization stage. Then, the trained RGB model is frozen and used as an oracle to mine positive examples and generate the positive set for Flow model training with Multi-Instance InfoNCE loss. Finally, this updated Flow Model becomes an oracle to do the same thing as mentioned above to improve the RGB model learn better representation with the information of the inter-videos. Cascade mining is a simple but effective module that enhances the power of oracle to mine positive examples. Specifically, both RGB and Flow memory queues are maintained with size K, and their features are from the same source video but from RGB and Flow view, respectively. Namely, these features share the same index in both RGB and Flow memory queues, as shown in FIGS. 5-6. For each stage, the similarity is calculated between the query and key features in the memory queue. According to selection ratio r, the k potential positive examples sorted by the similarity are selected, where selection ratio r is a ratio for the number of selection from this stage. The remaining features with a size like $k_1$ in the memory queue become candidates for the next stage. The process of cascade mining ends at the final stage and then the remaining features construct the positive set.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for model training and deployment, comprising:
   training, by a hardware processor, a model to learn video representations with a self-supervised contrastive loss by performing progressive training in phases with an incremental number of positive instances from one or more video sequences, resetting a learning rate schedule in each of the phases, and inheriting model weights from a checkpoint from a previous training phase;
   updating the trained model with the self-supervised contrastive loss given multiple positive instances obtained from Cascade K-Nearest Neighbor mining of the one or more video sequences by extracting features in different modalities to compute similarities between the one or more video sequences and selecting a top-k similar instances with features in different modalities;
   fine-tuning the trained model for a downstream task; and
   deploying the trained model for a target application inference for the downstream task.

2. The computer-implemented method of claim 1, wherein the training further comprises, in a feature space:
   pulling together positive feature pairs in a same or different modalities; and
   repelling apart negative feature pairs from spatiotemporally manipulated frames.

3. The computer-implemented method of claim 1, wherein the target application inference for the downstream task comprises action recognition involving a transformation from an input video to an output textual label indicative of the content of the input video.

4. The computer-implemented method of claim 1, wherein the self-supervised contrastive loss comprises a dot product and a temperature hyper-parameter to adjust a scale of the dot product.

5. The computer-implemented method of claim 1, wherein said training step iteratively selects a respective top-k similar instances at each of the phases, and remaining ones of the respective top-k similar instances at a final stage are used to form a positive set.

6. The computer-implemented method of claim 1, wherein the different modalities comprise decompressed RGB pixels, encoding residuals from frame differences, and motion vectors.

7. The computer-implemented method of claim 1, wherein two video clips from a same sequence comprise a positive pair, and two video clips from different video sequences comprise a negative pair for said training step.

8. The computer-implemented method of claim 1, wherein fine-tuning the trained model for a downstream task comprises using downstream task labels to fine-tune a pretrained model.

9. A computer program product for model training and deployment, the computer program product comprising a non-transitory computer readable storage medium having program instructions embodied therewith, the program instructions executable by a computer to cause the computer to perform a method comprising:

training, by a hardware processor of the computer, a model to learn video representations with a self-supervised contrastive loss by performing progressive training in phases with an incremental number of positive instances from one or more video sequences, resetting a learning rate schedule in each of the phases, and inheriting model weights from a checkpoint from a previous training phase;

updating, by the hardware processor, the trained model with the self-supervised contrastive loss given multiple positive instances obtained from Cascade K-Nearest Neighbor mining of the one or more video sequences by extracting features in different modalities to compute similarities between the one or more video sequences and selecting a top-k similar instances with features in different modalities;

fine-tuning, by the hardware processor, the trained model for a downstream task; and deploying, by the hardware processor, the trained model for a target application inference for the downstream task.

10. The computer program product of claim 9, wherein the training further comprises, in a feature space:

pulling together positive feature pairs in a same or different modalities; and repelling apart negative feature pairs from spatiotemporally manipulated frames.

11. The computer program product of claim 9, wherein the target application inference for the downstream task comprises action recognition involving a transformation from an input video to an output textual label indicative of the content of the input video.

12. The computer program product of claim 9, wherein the self-supervised contrastive loss comprises a dot product and a temperature hyper-parameter to adjust a scale of the dot product.

13. The computer program product of claim 9, wherein said training step iteratively selects a respective top-k similar instances at each of the phases, and remaining ones of the respective top-k similar instances at a final stage are used to form a positive set.

14. The computer program product of claim 9, wherein the different modalities comprise decompressed RGB pixels, encoding residuals from frame differences, and motion vectors.

15. The computer program product of claim 9, wherein two video clips from a same sequence comprise a positive pair, and two video clips from different video sequences comprise a negative pair for said training step.

16. The computer program product of claim 9, wherein fine-tuning the trained model for a downstream task comprises using downstream task labels to fine-tune a pretrained model.

17. A computer processing system for model training and deployment, comprising:

a memory device for storing program code; and a hardware processor operatively coupled to the memory device for running the program code to:

train a model to learn video representations with a self-supervised contrastive loss by performing progressive training in phases with an incremental number of positive instances from one or more video sequences, resetting a learning rate schedule in each of the phases, and inheriting model weights from a checkpoint from a previous training phase;

update the trained model with the self-supervised contrastive loss given multiple positive instances obtained from Cascade K-Nearest Neighbor mining of the one or more video sequences by extracting features in different modalities to compute similarities between the one or more video sequences and selecting a top-k similar instances with features in different modalities;

fine-tune the trained model for a downstream task; and deploy the trained model for a target application inference for the downstream task.

18. The computer processing system of claim 17, wherein the hardware processor further runs the program code such that the training, in a feature space, involves pulling together negative feature pairs in a same or different modalities, and repelling apart negative feature pairs from spatiotemporally manipulated frames.

19. The computer processing system of claim 17, wherein the target application inference for the downstream task comprises action recognition involving a transformation from an input video to an output textual label indicative of the content of the input video.

20. The computer processing system of claim 17, wherein the self-supervised contrastive loss comprises a dot product and a temperature hyper-parameter to adjust a scale of the dot product.

* * * * *